United States Patent [19]

Christopher

[11] 4,327,434
[45] Apr. 27, 1982

[54] VIDEO DISC STYLUS POSITION SENSOR SYSTEM

[75] Inventor: Todd J. Christopher, Indianapolis, Ind.

[73] Assignee: RCA Corporation, New York, N.Y.

[21] Appl. No.: 116,249

[22] Filed: Jan. 28, 1980

[51] Int. Cl.³ ............................................. G11B 17/06
[52] U.S. Cl. ...................................... 369/220; 369/43
[58] Field of Search .................. 369/43, 219, 220; 318/662; 360/75, 77

[56] References Cited

U.S. PATENT DOCUMENTS

| | | | |
|---|---|---|---|
| 2,915,315 | 12/1959 | Rabinow | 369/220 |
| 3,572,724 | 3/1971 | Rabinow | 369/220 |
| 4,064,539 | 12/1977 | Lewiner et al. | 318/662 X |
| 4,157,576 | 6/1979 | Hack et al. | 360/77 |
| 4,167,762 | 9/1979 | Hashizaki et al. | 360/77 |
| 4,280,023 | 7/1981 | Christopher | 369/43 |

FOREIGN PATENT DOCUMENTS 2818845 11/1978 Fed. Rep. of Germany.
1361610 7/1974 United Kingdom.
496596 3/1976 U.S.S.R..

Primary Examiner—Charles E. Phillips
Attorney, Agent, or Firm—E. M. Whitacre; J. S. Tripoli; E. P. Herrmann

[57] ABSTRACT

A stylus position sensor for a video disc player apparatus. An electrode secured in fixed relation to a movable stylus is disposed between first and second electrodes to form first and second variable capacitors therewith. The capacitance of the variable capacitors change in accordance with the motion of the stylus related electrode between the first and second electrodes. A time varying signal is applied through fixed impedances to the first and second electrodes, the amplitude of the signal being modulated by voltage variable impedances connected between the first and second electrodes and a point of fixed potential. The modulated signals at said first and second electrodes are coupled to the stylus related electrode and the time average of the summed signal is indicative of the position of the stylus related electrode and thereby the stylus with respect to the first and second electrodes.

10 Claims, 8 Drawing Figures

VIDEO DISC STYLUS POSITION SENSOR SYSTEM

This invention relates to video disc signal pickup apparatus and in particular to apparatus for determining the relative position of a signal pickup stylus with respect to the carriage assembly which translates the pickup stylus radially across the disc record.

Certain types of video disc systems utilize disc records wherein information is prerecorded by means of geometric variations in tracks or grooves proximate the surface of the disc. The information is reproduced by means of a signal pickup stylus which engages the track or groove and detects the geometric variations representative of the prerecorded signal. In the capacitance type systems the stylus-record interaction operates to form a time varying capacitance as the geometric variations in a particular track are moved past the stylus by the rotation of the disc, which time varying capacitance forms part of a tuned circuit to amplitude modulate a carrier frequency. The amplitude modulation is thereafter detected and converted to video and audio signals suitable for reproduction on standard receivers. In the pressure sensitive systems, geometric variations in the groove apply a time varying force to the stylus which is mechanically coupled to a pressure sensitive transducer for conversion to electrical signals.

Video disc systems of this type typically employ disc records having track or groove densities of 6,000 to 10,000 per inch. As a result of such high groove densities, it is difficult to reliably translate the stylus radially across the disc in accordance with normal play. Therefore the signal pickup stylus is mounted in a carriage assembly driven by motive means for translating the stylus radially across the disc generally synchronously with the rotation of the disc. Because the tracks tend to be slightly eccentric the stylus is mounted within the carriage for limited radial movement of the stylus with respect to the carriage. Such relative movement mechanically biases the stylus mounting arm from its home position and undesirably affects a stylus deflection transducer which provides for stop motion and other special effects. In order to compensate for this condition, the relative stylus position with respect to the carriage assembly is monitored, and the carriage translation is controlled to maintain the stylus mounting arm in a generally unbiased condition and the stylus centered over the track.

One such stylus position monitoring system is disclosed in U.S. patent application Ser. No. 055,976 filed July 9, 1979 entitled, "Stylus Position Sensing Apparatus for Video Disc Player" assigned to the assignee of the present invention. That particular invention senses the stylus position by (a) establishing a capacitance between a first electrode fixed to the carriage and a second electrode in fixed relation to the stylus, (b) measuring the change in capacitance caused by changes in the relative proximity of the first and second electrodes to each other by (c) detecting the relative amplitude of an oscillatory signal coupled from the first to the second electrode, and (d) generating a control signal proportional to such coupled signal. The performance of this system may be affected, however, from changes in the parasitic electronic parameters present between the stylus-stylus arm-record system as well as variations in active-gain elements of the system. Changes in the parasitic parameters tend to affect the amplitude of the oscillatory signal coupled from the first to the second electrodes and consequently cause errors in the control system, especially when the coupled signal is measured against a fixed reference.

The present invention is directed toward a balanced sensing system wherein two signals from two electrodes disposed on either side of a third electrode in fixed relation to the stylus coupled complementary signals to the third electrode. The two signals couple to the third electrode proportional to the varying capacitance formed between the electrodes and are arranged to sum to zero when the third electrode, and consequently the stylus, is in the desired position. Translation of the third electrode from the desired position creates a change in the summed signals, the amplitude and phase being respectively indicative of the extent and direction of such motion.

Figure 1:
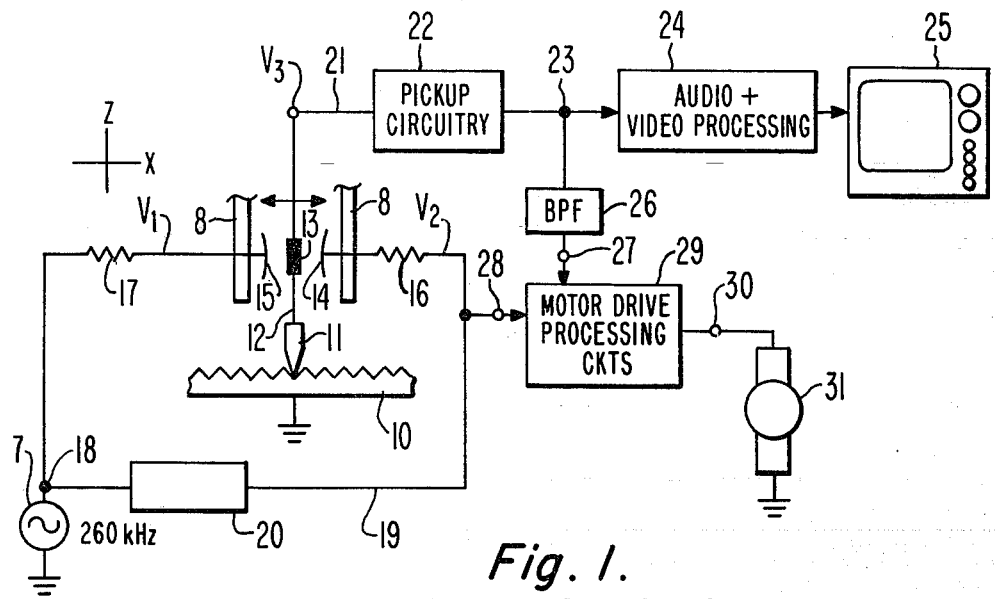
FIG. 1 is a partial schematic and partial block diagram of a balanced stylus position sensing system.

In FIG. 1 a signal pickup stylus 11 engages a record disc 10 for reproducing signals that have been prerecorded in tracks located on the surface of the disc. The signals on the disc are coupled via the stylus and connecting leads 12 and 21 to the pickup circuitry 22 to produce a frequency modulated or FM signal. The FM signal is subsequently processed by circuitry 24 to condition it for playback on the TV receiver 25. The stylus 11 is secured to a stylus arm (not shown) which is compliantly mounted to a carriage assembly for translating the stylus radially across the record disc, i.e., the direction designated "x" in the drawing. The mounting of the stylus arm to the carriage assembly may be directly to the carriage assembly or to a removably mounted cartridge within the carriage assembly. The elements 8 represent support members fixed to the cartridge or carriage assembly and disposed on either side of the stylus/stylus arm assembly. Secured to the support members in relatively close proximity to the stylus are first 14 and second 15 conducting electrodes. A third electrode 13 is secured to the stylus/stylus arm assembly located between the first and second electrodes 14 and 15. The third electrode 13 is constrained to move in accordance with at least the "x" directed stylus motion. Electrode 13 may be a separate conductive element secured to the stylus arm and electrically connected to the flylead 12 for electrically connecting the stylus to the pickup circuitry or electrode 13 may be a portion of the flylead per se which portion generally moves in conformance with the stylus.

First electrode 14 and third electrode 13 constitute the plates of a first variable air dielectric capacitor and second electrode 15 and third electrode 13 constitute the plates of a second variable air dielectric capacitor, the capacitance of the first and second variable capacitors changing in a quasi-complementary manner as the third electrode undergoes "x" directed motion relative to the elements 8 fixed to the carriage assembly. The first (second) capacitor increases in capacitance as the second (first) capacitor decreases in capacitance according to the relation $$C = \frac{\epsilon A}{d \pm x}$$

where $\epsilon$ is the permitivity of air, A is the area of the electrode 13 parallel to and adjacent respective electrodes 14 and 15, d is one-half the distance between electrodes 14 and 15 and x is the distance electrode 13 is displaced from the center position. For electrode 13 centered between electrodes 14 and 15, "x" is equal to zero and the first and second capacitors have equal capacitance values.

A signal source 7 provides a time varying signal of a generally oscillatory nature, which signal may be a regular waveform such as a sinusoid or square wave, for example, or an arbitrary waveform. For descriptive purposes herein, source 7 will be presumed to produce a sinusoidally varying signal. The source 7 applies a first signal, V1, to electrode 15 via impedance 17. The signal from source 7 is also operated on by circuit 20 to form a further signal V2 which is the complement of signal $V_1$ and signal $V_2$ is applied to electrode 14 via impedance 16. Here the complement of a signal is defined as a signal of instantaneous inverse polarity to the given signal with respect to a given reference. In the case of a regular oscillatory signal of constant frequency its complement is a similar signal but with a 180 degree phase difference. The amplitudes of the signal and its complement, for this application, need not be equal. Only in the case where the physical parameters of the balanced system are identical on both sides of the center electrode and it is desired to null the stylus exactly midway between the two fixed electrodes will the amplitudes of the signal and its complement be equal.

The signals $V_1$ and $V_2$ applied to electrodes 14 and 15 are algebraically summed at electrode 13 by the coupling of the first and second capacitors. On the condition that the amplitude of signal V1 is equal to the amplitude of signal V2, the sum V3 of such signals equals zero for electrode 13 disposed equidistant from electrodes 14 and 15. As electrode 13 deviates from the center position and approaches either electrode 14 or 15, potential V3 increases in amplitude and assumes the phase angle of the signal of the nearer electrode. The amplitude and phase of potential V3 are indicative of the extent and the direction stylus 11 has moved relative to the fixed elements 8 (see FIG. 2).

Figure 2:
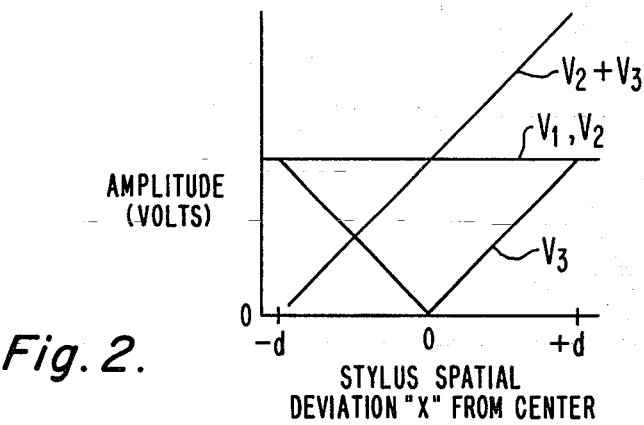
FIG. 2 is a graph of signal amplitude versus distance of stylus movement for various circuit nodes in the FIG. 1 system.

In FIG. 2 potentials V1 and V2 are of constant amplitude but anti-phase and are unaffected by the stylus position. The sum, $V_3$, of that portion of signals V1 and V2 coupled to electrode 13 is zero for a zero deviation from the center position, with its amplitude increasing for deviations of the stylus on either side of the center position. The phase of $V_3$ is presumed to be in phase with V1 to the left or center and to be in phase with V2 to the right of center. The sum of V2+V3 at the center position is therefore equal to V2 since V3 is zero, decreasing to the left of center because V2 and V3 are 180 degrees out of phase and increasing to the right of center because V2 and V3 are in phase. The curves V3 and V2+V3 are depicted as being linear in FIG. 2 which condition obtains where the pickup circuitry 22 is linear or voltage invariant. On the other hand, if circuit 22 is of the type having nonlinear input characteristics then the curves V3 and V2—V3 will exhibit nonlinearities as a consequence thereof, and means may be required to compensate for such nonlinearities. [It should be realized that $V_3$ and V2+V3 are not in fact linear due to the 1/x capacitance relationship, but for small deviations of the center electrode the capacitance change approaches a linear functional relationship with distance x.]

The signal V3 after processing by the pickup circuitry 22 is actually a composite signal comprising the FM signal, representative of the signal prerecorded on the disc, combined with the sum of signals V1 and V2. This composite signal at terminal 23 is applied to the bandpass filter 26. Bandpass filter 26 is designed to pass to its output terminal 27, substantially only frequency components attributable to signals V1 and V2. The signal at terminal 27 is applied to processing circuitry 29 where it is detected and buffered to modulate the potential applied to the carriage drive motor 31.

Figure 3:
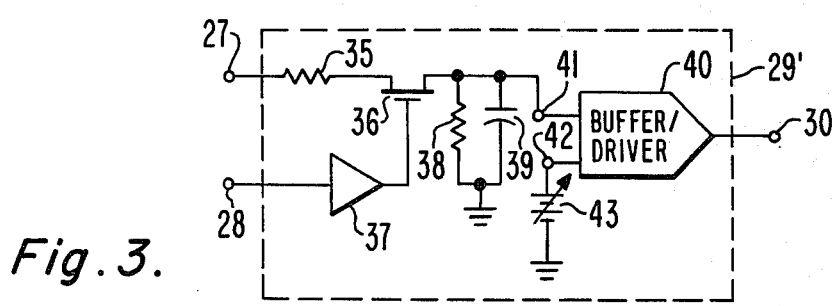
FIG. 3 is a partial schematic, partial block diagram of a synchronous detector-driver circuit.

FIG. 3 represents a particular circuit 29' to realize the function of the motor drive processing circuitry 29. This circuitry consists of a synchronous detector and a buffer/driver 40. Buffer/driver 40 responsive to a DC potential applied to its input terminal 42 by source 43 generates a nominal signal at its output 30 for energizing the motor 31 to drive the carriage radially across the disc record substantially synchronously with the disc rotation. The signal at the output 30 of buffer/driver 40 is subject to being increased or decreased in accordance with a correction signal applied to a second input terminal 41. The synchronous detector comprises a transistor switch 36 which is opened and closed in phase with one of the signals applied to electrodes 14 or 15. This signal is applied to terminal 28 and is conditioned by amplifier 37 to energize the control electrode of the transistor for rapid transitions between conduction and non-conduction. The summed signal V3 is applied to terminal 27 from which it is selectively applied by the transistor switch 36 to the capacitor 39-resistor 38 combination. For switch 36 closed capacitor 39 charges in potential commensurate with the potential appearing at terminal 27. For switch 36 open the capacitor partially discharges through resistor 38. The resultant potential on the capacitor 39, which is applied to terminal 41, tends toward the average value of the half rectified signal V3. The resultant potential is positive if the signals applied to terminals 27 and 28 are in phase and negative if they are out of phase. Thus the synchronous detector is capable of delivering bidirectional signals for controlling the buffer/driver 40. Conversely capacitor 39 and resistor 38 may be returned to a prescribed reference potential other than ground reference in which case the potential at terminal 41 will be varied about the prescribed reference for controlling buffer 40.

Figure 4:
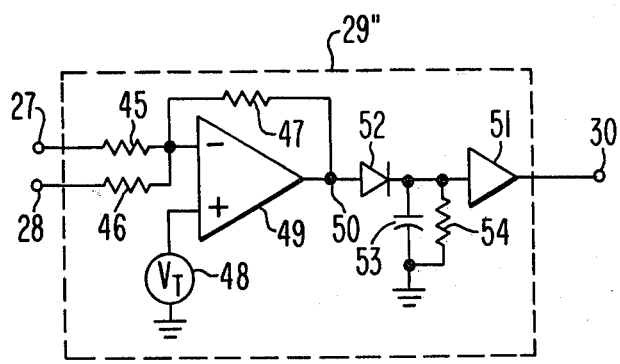
FIG. 4 is a block diagram of a summing and averaging circuit for processing the sensor signal.

FIG. 4 is a schematic of an alternate detection circuit 29". In this circuit amplifier 49 sums the signals applied to terminals 27 and 28 generating an AC output potential at terminal 50 expressed by V50=V27·R47/R45+V28·R47/R46 where V50, V27 and V28 are respectively the amplitudes of the signals at terminals 50, 27 and 28 and R45, R46 and R47 are the respective resistance values of resistors 45, 46 and 47. If the signal V3 applied to terminal 27 is zero, corresponding to the stylus being in its centered position, the potential at the amplifier 49 output terminal 50 is proportional to the signal V1 or V2 applied to terminal 28 and is presumed of substantially constant nominal amplitude. This signal is detected by the diode detector comprising diode 52, capacitor 53 and resistor 54 and then buffered by circuit 51 before being made available at output terminal 30. As the stylus is displaced from the center position the amplitude of the AC signal at terminal 50 is modulated by the signal applied to the terminal 27. If the signals at terminals 27 and 28 are in phase the amplitude of the signal at output terminal 50 increases above the nominal value and decreases when they are out of phase. The DC output potential at terminal 30 increases and decreases in conformance with the increase and or decrease in amplitude of the AC signal at terminal 50 typified by the curve V2+V3 in FIG. 2. A DC potential applied to the non-inverting input terminal of amplifier 49 by potential source 48 permits adjustment of the nominal DC potential appearing at output terminal 30.

Figure 5:
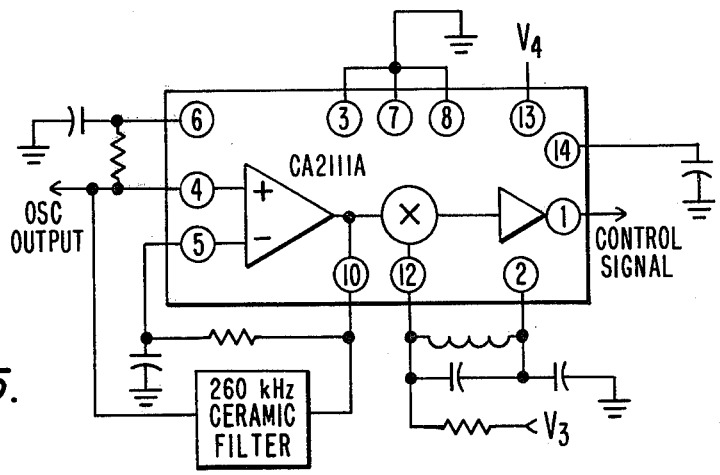
FIG. 5 is a block diagram of a preferred circuit for generating the oscillatory signal and detecting the sensor signal.

FIG. 5 illustrates the manner in which both the oscillator 7 and the processing circuits may be realized utilizing a commercially available integrated circuit such as the Motorola MC1357 or RCA Corp. CA2111A FM limiter and balanced product detector. The numbering in the figure conforms to the numbers of the package connection pins for the standard 14 pin dual in-line plastic package. Note the product detector is utilized as a synchronous detector with a first input signal V3 derived from the pickup circuitry, and a second input signal taken from the limiter amplifier connected with a ceramic filter to form an oscillator useful for driving the electrodes 14 and 15.

Figure 6:
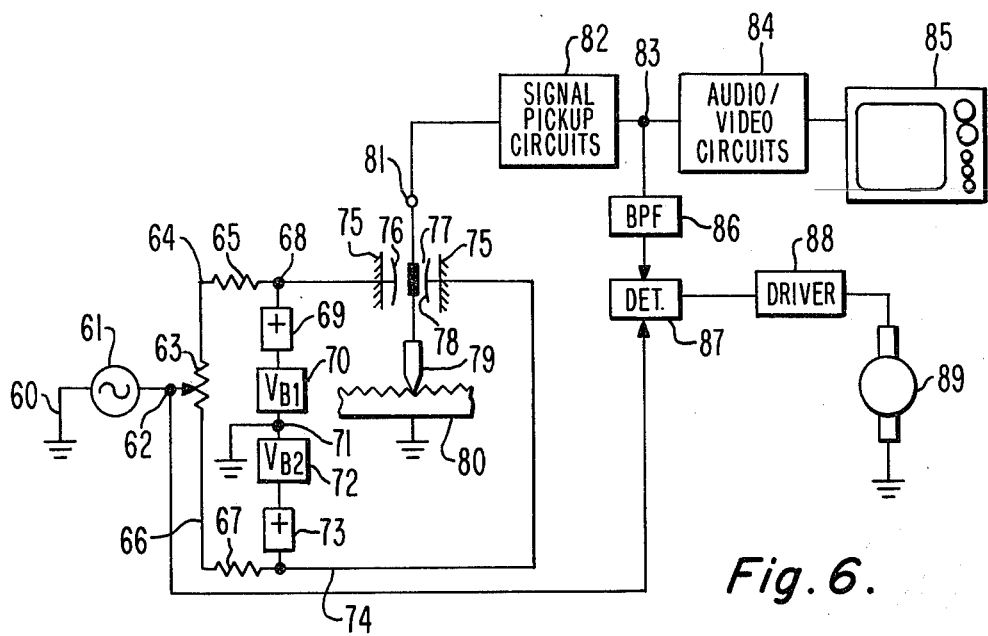
FIGS. 6 and 8 are partial schematic and partial block diagrams of balanced signal pickup stylus position sensor systems embodying the present invention.

FIG. 6 is a second embodiment of a balanced position sensor wherein the oscillatory signals applied to the two fixed sensor capacitor electrodes are of the same phase but their amplitudes are assymetrically modulated in a quasi-complementary manner.

A consequence of applying in-phase signals to the fixed electrodes 76 and 78 is that the signal components coupled to the third electrode 77 do not sum to zero for the stylus in the null position. To effect a null signal, the applied signals are arranged so that the time average of the summed signal at the third electrode 17 equals zero. The time average of the sum of the signals is detected in this arrangement rather than the absolute value of the sum of the signals.

Modulation of the amplitudes of the signals applied to the first and second electrodes is effected at the first and second electrodes by first and second voltage variable impedance means connected respectively between the electrodes and a point of reference potential. The voltage variable impedance means are arranged so that the voltage effected impedance changes of the first variable impedance is complementary to the voltage effected impedance change of the second variable impedance, i.e., the value of the first variable impedance increases concurrently with a decrease in the second variable impedance, and the value of the first variable impedance decreases concurrently with an increase in the value of the second variable impedance. The variable impedances may be in the form of capacitances, resistances, etc., and chosen so that their impedance values do not load the stylus-record disc-pickup circuitry system.

In FIG. 6 an AC signal from voltage source 61 is applied through potentiometer 63 and resistor 65 to fixed capacitor electrode 76, and applied through potentiometer 63 and resistor 67 to fixed capacitor electrode 78. (Potentiometer 63 is utilized to adjust the signals at electrodes 76 and 77 for producing a null signal at the central electrode 77 with the central electrode 77 in the desired position.) A first voltage variable impedance, or VVI, 69 has a first end thereof connected at connection 68 to the fixed capacitor electrode 76 and a second end thereof connected via bias potential 70 to a reference potential at terminal 71. A second VVI 73, similar to 69, has a first end connected at connection 74 to capacitor electrode 78 and a second end connected via bias potential 72 to reference potential at terminal 71. VVI 73 is poled oppositely to VVI 69 so that a potential change applied by potential source 61 creates complementary impedance changes in VVI73 and VVI69.

VVI69 and resistor 65 form a voltage divider which establishes the AC potential at electrode 76 as a function of the applied voltage at connection 64 or $V76 = V64(Z69/(Z69 + R65))$ where V76 and V64 are respectively the potentials at electrode 76 and connection 64 while Z69 and R65 are the impedance and resistance values of VVI69 and resistor 645. Similarly the potential V78 at electrode 78 is given by $V78 = V66(Z73/(Z73 + R67))$.

Figure 7:
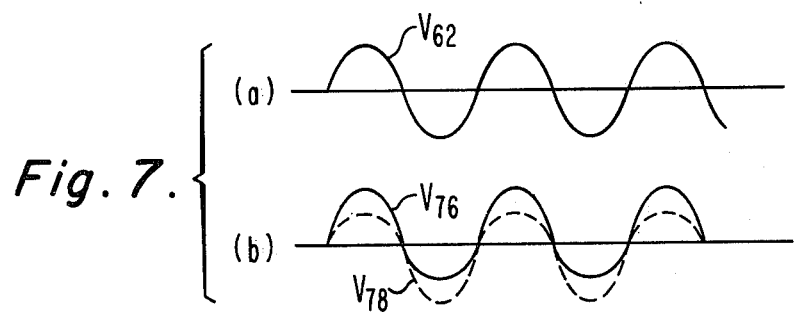
FIG. 7 is a time vs. amplitude graph illustrating the potentials applied at the sensor electrodes of FIG. 6.

For illustrative purposes consider that potential V64 equals potential V66 and that the potential signal from source 61 is a sinusoidal waveform (waveform V62 in FIG. 7). The positive half cycles of the waveform appearing at connection 68 cause the impedance of VVI 69 to increase and the negative half cycles cause the impedance to decrease, thus the potential V76 is a greater proportion of V64 for the positive half cycles than for the negative half cycles. Conversely the potential V78 is a greater proportion of V66 for the negative half cycles than the positive half cycles. The effect is illustrated in waveform (b) of FIG. 7 wherein it is seen that the peak potentials for alternate half cycles of V76 and V78 are compressed and expanded.

Considering the central electrode 77 equidistant from electrodes 76 and 78 and the potentials V76 and V78 appearing thereat to have similar amplitudes but assymetrical waveshapes in relation to their polarity, the average value of the potential coupled to electrode 77 is zero, i.e., the average of the sum of the compressed half cycles is zero and the average of the sum of the non-compressed half cycles is zero. As the control electrode is displaced from the central or null position, the average value of the signals coupled to electrode 77 increases or decreases. Consider now the case when electrode 77 approaches electrode 78. In this case a greater proportion of signal V78 and a lesser proportion of signal V76 is coupled to electrode 77. Since the average value of signal V78 by itself is negative and the sum of signals V78 and V74 when equally coupled to electrode 77 is just equal to zero, the condition for electrode 77 approaching electrode 78 must produce a summed signal having a negative average value. On the other hand, since signal V76, by itself, has a positive average value the consequence of electrode 77 being displaced nearer electrode 76 is to produce a summed signal having a positive average value. The value of the average signal is thus indicative of the amount of displacement of electrode 77, and the polarity is indicative of direction of its displacement. The bias potentials 70 and 72 are included when applicable to condition the particular voltage variable impedance for operation within the desired region of its operating characteristics.

The detector 87 in FIG. 6 is of the type that determines or responds to changes in average value. For example, a low pass filter would perform the function though its response would be slow. A balanced synchronous detector or product detector as in FIG. 5 is more desirable.

A second operable mode for the circuit of FIG. 6 may be effected by arranging the VVI devices 73 and 69 and the variable air dielectric capacitances to interact directly with the signal pickup circuitry to generate a control signal proportional to the stylus position. In this mode the pickup circuitry is not responsive to the signal per se from source 61, e.g., a time varying voltage, or its modulated components coupled to the third electrode. The pickup circuitry is of a type which generates a signal responsive to the instantaneous impedance appearing at its input. This arrangement lends itself to generating a control signal having an absolute null rather than a time average null as in the foregoing. A particular embodiment employing this technique is illustrated in FIG. 8, the operation of which is generally illustrative of the second operable mode for the position sensing circuitry.

Figure 8:
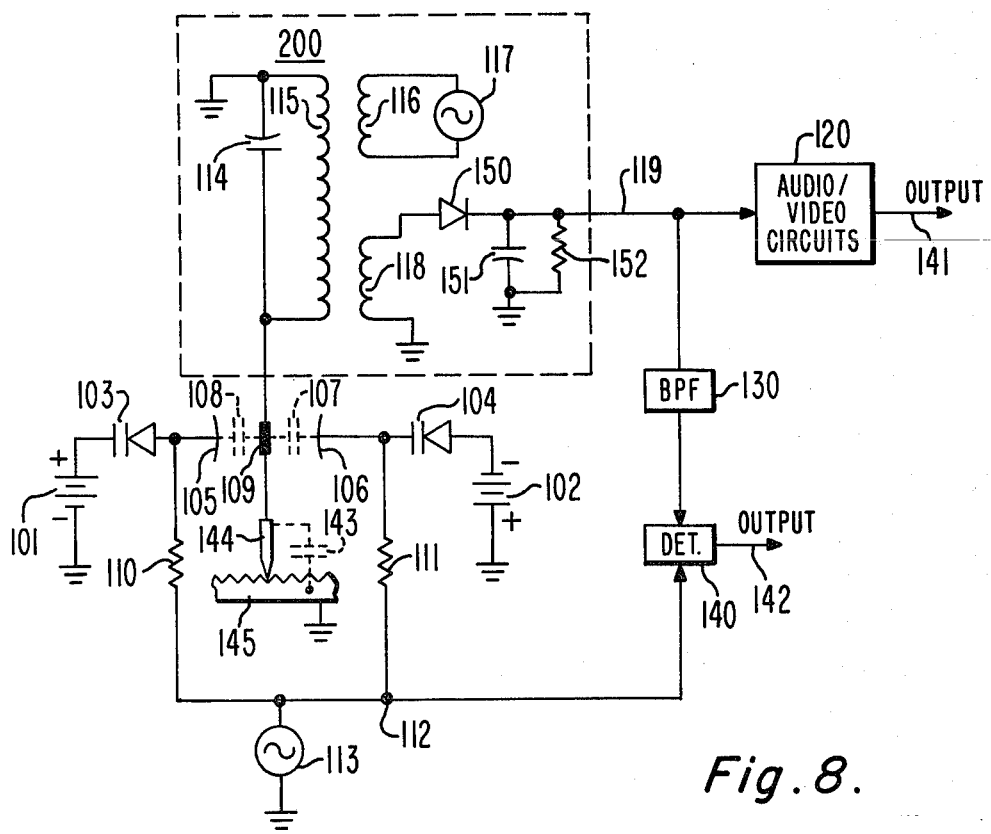

The FIG. 8 arrangement is a particular application of a balanced sensor system employing varactor diodes as voltage variable impedances in a capacitive pickup type of video disc system. In FIG. 8, the circuitry 200 circumscribed by the broken line represents a particular signal pickup circuit which cooperates with the stylus-record capacitance 143 to retrieve the prerecorded signal from record disc 145. The capacitor 143 is the effective capacitance formed between the stylus 144 and the record disc and varies in accordance with the geometric pattern in the disc groove moving past the stylus. Capacitor 143 is effectively in parallel connection with capacitor 114 and inductor 115 to form a parallel resonant or tank circuit. A coil 116 driven by an oscillatory potential source 117, e.g., a sinusoid of 915 MHz, inductively couples a signal to the tank circuit at a frequency slightly greater or slightly lesser than the nominal resonance frequency of the tank circuit. More precisely, the signal from source 117 intercepts the amplitude-frequency characteristic of the tank circuit at one-half its peak value. Changes in the capacitance value of capacitor 143 due to the recorded signal, alters the resonant frequency of the tank circuit causing the oscillatory signal coupled thereto to be amplitude modulated in accordance with the prerecorded signal. The amplitude modulated oscillatory signal is picked off the tank circuit by coil 118 and applied to the detector circuit comprised of diode 150 and the resistor-capacitor combination 152, 151 respectively, which circuit effectively removes the oscillatory signal generated by the source 117 and supplies a signal representative of the prerecorded signal in the record disc to connection 119. This signal is processed by the audio and/or video circuits 120 for transmission to a standard receiver.

Onto the foregoing system a balanced stylus position-sensor is effecutated using electrodes 105, 106 and 109 to form position-sensitive capacitances 107 and 108. A first varactor diode 103 serially connects capacitance 108 to reference potential 101 and a second varactor diode 104 serially connects capacitance 107 to reference potential 102. The serial connection of capacitor 108 and the effective capacitance of varactor diode 103, the serial connection of capacitor 107 and the effective capacitance of varactor diode 104 and the capacitance 143 are all effectively in parallel connection with capacitor 114 and may operate to change the resonant frequency of the tank circuit. An oscillatory signal from source 113, e.g., a 262 KHz sinusoid, applied a time varying potential via resistors 110 and 111 respectively to the anode of varactor diode 104 and to the cathode of varactor diode 103, which time varying signal causes a modulation of the effective capacitance values of the varactors 103 and 104. The capacitance of varactor 103 increases (decreases) as the capacitance of varactor 104 decreases (increases). The total capacitance contributed by the varactor diodes across the tank circuit coil 115 remains constant for the condition that capacitances 107 and 108 are equal and the varactors are similar and have a linear capacitance-voltage relationship. As long as the capacitance of the position sensing elements remains constant, there is zero signal contribution from the oscillator 113 at output 119 of detector 150 and therefore an absolute null may be realized.

A translation of the stylus and therefore the center electrode 109 will cause an increase (decrease) in capacitance 107 and a concomitant decrease (increase) in capacitance 108. Consider capacitance 107 increased by a rightward translation of the stylus. The capacitance 107 increases and the total capacitance exhibited by all the capacitors across the tank circuit is larger in time synchronism with the negative half cycles of the signal from source 113. Conversely, for leftward translation of the stylus the total effective capacitance is greater in time synchronism with the positive half cycles of the signal from source 113. These capacitance modulations effect an amplitude modulation of the signal applied to the tank circuit from source 117 in a similar fashion to the record disc induced modulation. The amount of capacitance modulation and thereby the amplitude modulation of the carrier signal is indicative of the extent of stylus translation and the phase of the ultimate signal is indicative of the direction of translation.

The prerecorded signals and the translation induced signals form a composite signal available at connection 119. The translation induced signal is then extracted from the composite by bandpass filter 130 and detected by synchronous detector 140 to generate a d.c. control signal at output terminal 142.

The system illustrated in FIG. 8 is not limited to the use of varactors as the voltage variable impedance elements. The primary requirement imposed by the system is that the total reactance imposed by the position sensing elements across the tank circuit of capacitor 114 and coil 115 remain constant for a null position of electrode 109.

The signal from sources 61 and 113 in FIGS. 6 and 8 respectively may be applied to the fixed capacitor electrodes via the voltage variable elements rather than as indicated in the drawing by a simple interchanging the VVI's and the resistors. For example, in FIG. 8, varactor 103 may be interchanged with resistor 110 such that resistor 110 is connected between bias 101 and electrode 105, and varactor 103 is connected between source 113 and electrode 105 with the anode of the varactor connected at source 113. Similarly varactor 104 and resistor 111 may be interchanged, in which case the cathode of varactor 104 is connected to souce 113. Depending upon whether the system employed is signal (e.g., voltage) sensitive or impedance sensitive, there are advantages as to the method used to connect the source to the voltage variable elements and/or the capacitor electrodes.

Further, it should be realized that the variable impedances are not limited to the voltage variable type. For example, current variable impedances such as saturable reactors may be used in a particular implementation.

What is claimed is:

1. A video disc stylus position sensor system of the type having a signal pickup stylus secured to a stylus arm, said stylus arm being compliantly mounted in a carriage assembly for translating the pickup stylus radially across a record disc and permitting relative movement between the pickup stylus and the carriage assembly, said sensor system having first and second variable capacitors formed by first and second electrodes secured to the carriage assembly and a third electrode disposed therebetween, said third electrode forming one plate of both said first and said second capacitors and having a fixed relation to said pickup stylus, and wherein the position of the stylus is determined by the resultant composite signal generated at the third electrode, said resultant composite signal being derived from the coupling of signals applied to said first and second electrodes through the capacitance of the variable capacitors wherein the improvement comprises:
    means for providing a time varying signal of substantially constant amplitude;
    first and second impedance means connected respectively between the means for providing the time varying signal and said first and second electrode;
    a first voltage variable impedance means connected between said first electrode and a point of fixed potential, said first voltage variable impedance means increasing in value for increasing potential of a given polarity applied to the first electrode; and
    a second voltage variable impedance means connected between said second electrode and a point of fixed potential, said second voltage variable impedance means decreasing in value for increasing potential of said given polarity applied to the second electrode, said first voltage variable impedance means causing an amplitude modulation of the signal applied to the first electrode complementary to an amplitude modulation caused by the second voltage variable impedance of the signal applied to the second electrode.

2. The video disc stylus position sensor as set forth in claim 1 wherein said first and second voltage variable impedance means are varactor diodes.

3. The video disc stylus position sensor system as set forth in claim 1 further comprising means between the means for providing the time varying signal and said first and second impedance means for adjusting the relative amplitude of the signal applied to the first electrode with respect to the amplitude of the signal applied to the second electrode.

4. An apparatus for sensing the relative position of a first element relative to a second element comprising:
    a first electrode in fixed relation with the first element and constrained to move therewith;
    second and third electrodes in fixed relation with the second element and disposed on either side of the first electrode, said first and second electrodes forming a first variable capacitance and said first and third electrodes forming a second variable capacitance;
    a time varying signal source;
    first and second similar variable impedance means;
    means connecting the first variable impedance means in a first serial impedance combination with said first variable capacitance such that the impedance value of said first variable impedance is varied synchronously by said time varying signal source, respectively increasing and decreasing in impedance value with first and second polarity signals;
    means connecting the second variable impedance means in a second serial impedance combination with said second variable capacitance such that the impedance value of said second variable impedance is varied synchronously by said time varying signal source, respectively decreasing and increasing in impedance value with said first and said second polarity signals; said first and second serial impedance combinations being in parallel connection with respect to the first electrode;
    signal pickup circuitry responsive to impedance values, said circuitry connected to said first electrode for generating a control signal indicative of the impedance value of the parallel connection of the first and second serial impedance combinations as a function of the relative position of the first element relative to the second element.

5. An apparatus as set forth in claim 4 wherein said first and second similar variable impedances are first and second varactor diodes.

6. An apparatus as set forth in claim 4 or 5 wherein said signal pickup circuitry includes a resonant circuit in parallel connection with said first and second serial impedance combinations, such that the serial impedance combinations vary the resonant frequency of the resonant circuit synchronously with the time varying signal source and in a prescribed manner with respect to the relative position of the first and second elements.

7. An apparatus as set forth in claim 6 wherein the signal pickup circuitry further includes;
    an oscillatory voltage source having its signal coupled to said resonant circuit, said signal being amplitude modulated in consonance with changes of the resonant frequency of said resonant circuit;
    detector means, coupled to said resonant circuit for sensing the amplitude modulated signal and producing a further signal representing the amplitude modulations;
    a synchronous detector for synchronously detecting said further signal with said time varying signal.

8. In combination:
    a video disc signal pickup stylus secured to a stylus arm compliantly mounted to a carriage assembly for translating the pickup stylus radially across a record disc;
    first and second electrodes secured in fixed relation to the carriage assembly proximate the pickup stylus and on either side thereof;
    a third electrode disposed between said first and second electrodes and having a fixed relation to the pickup stylus and forming first and second capacitors with said first and second electrodes respectively, the capacitance values of said first and second capacitors varying in accordance with the relative position of the pickup stylus with respect to the carriage assembly;
    means for applying an AC signal;
    first and second means respectively connecting the first and second electrodes to the means for applying an AC signal;
    a first voltage variable capacitance connected between the first electrode and a point of fixed potential, said first voltage variable capacitor increasing in capacitance with increasing potentials of a given polarity applied to the first electrode;

a second voltage variable capacitor connected between the second electrode and said point of fixed potential, said second voltage variable capacitor decreasing in capacitance with increasing potential of said given polarity applied to the second electrode, the first and second voltage variable capacitors modulating the amplitude of the signals appearing at the first and second electrodes in complementary fashion; and circuitry connected to the third electrode, responsive to the signals coupled thereto from said first and second electrodes for generating a control signal in accordance with the relative position of said third electrode with respect to the first and second electrodes to control the translation of the carriage assembly.

9. In combination:

a video disc signal pickup stylus secured to a stylus arm compliantly mounted to a carriage assembly for translating the pickup stylus radially across a record disc;

first and second electrodes secured in fixed relation to the carriage assembly proximate the pickup stylus and on either side thereof;

a third electrode disposed between said first and second electrodes and having a fixed relation to the pickup stylus and forming first and second capacitors with said first and second electrodes respectively, the capacitance values of said first and second capacitors varying in accordance with the relative position of the pickup stylus with respect to the carriage assembly;

means for applying an AC signal;

a first voltage variable capacitance connected in a first serial combination with said first capacitor;

means connecting the first voltage variable capacitance to the means for applying an AC signal for increasing its capacitance with increasing potentials of a given polarity of said AC signal;

a second voltage variable capacitance connected in a second serial combination with said second capacitor;

means connecting the second voltage variable capacitance to the means for applying an AC signal for decreasing its capacitance with said increasing potentials of a given polarity of said AC signal; and circuitry connected to the third electrode, said circuitry being responsive to the changes of capacitance of the first serially connected capacitor combination with respect to capacitance changes of the second serially connected capacitor combination for generating a control signal indicative of the relative value of the first and second capacitors and thereby the position of the signal pickup stylus with respect to the carriage assembly.

10. The combination as set forth in claim 8 or 9 wherein the circuitry connected to the third electrode includes a synchronous detector connected for receiving signal derived from said third electrode and further connected for receiving signal from said means for applying an AC signal, said synchronous detector generating at an output terminal a substantially d.c. potential proportional to the displacement of the third electrode with respect to said first and second electrodes.

* * * * *